(12) United States Patent
Peumans et al.

(10) Patent No.: US 12,145,123 B2
(45) Date of Patent: Nov. 19, 2024

(54) ADDRESSABLE MICRO-REACTION CHAMBER ARRAY

(71) Applicants: IMEC VZW, Leuven (BE); Katholieke Universiteit Leuven, Leuven (BE)

(72) Inventors: Peter Peumans, Herfelingen (BE); Ahmed Taher, Heverlee (BE); Nicolas Vergauwe, Borgloon (BE); Benjamin Jones, Kessel-Lo (BE)

(73) Assignees: IMEC VZW, Leuven (BE); KATHOLIEKE UNIVERSITEIT LEUVEN, Leuven (BE)

( * ) Notice: Subject to any disclaimer, the term of this patent is extended or adjusted under 35 U.S.C. 154(b) by 700 days.

(21) Appl. No.: 17/416,465

(22) PCT Filed: Dec. 16, 2019

(86) PCT No.: PCT/EP2019/085258
§ 371 (c)(1),
(2) Date: Jun. 18, 2021

(87) PCT Pub. No.: WO2020/126985
PCT Pub. Date: Jun. 25, 2020

(65) Prior Publication Data
US 2022/0062850 A1    Mar. 3, 2022

(30) Foreign Application Priority Data

Dec. 20, 2018    (EP) .................................... 18214515

(51) Int. Cl.
*B01J 19/00*    (2006.01)
*B01L 3/00*    (2006.01)

(52) U.S. Cl.
CPC ..... *B01J 19/0093* (2013.01); *B01L 3/502784* (2013.01); *B01J 2219/00819* (2013.01);
(Continued)

(58) Field of Classification Search
None
See application file for complete search history.

(56) References Cited

U.S. PATENT DOCUMENTS 6,126,899 A    10/2000    Albin et al.
6,982,064 B1*    1/2006    Ehrfeld ............... B01F 25/4323
                                                    138/37
(Continued)

OTHER PUBLICATIONS

International Search Report and Written Opinion dated Dec. 2, 2020 for International Application No. PCT/EP2019/085258.

*Primary Examiner* — Lore R Jarrett
(74) *Attorney, Agent, or Firm* — MOSER TABOADA

(57) ABSTRACT

The present invention provides a micro-reactor (1) adapted to host chemical reactions having at least one microfluidic layer, said micro-reactor (1) comprising a fluid inlet (2) and a fluid outlet (3); a plurality of micro-reaction chambers (10) arranged in rows (7) and columns (6), each micro-reaction chamber comprising a chamber inlet (10*a*) and a chamber outlet (10*b*); a plurality of supply channels (4) for supplying fluid to from said fluid inlet (2) to said micro-reaction chambers (10) and further arranged for draining said micro-reaction chambers (10) to said fluid outlet (3), said supply channels (10) extending in a first direction (D1) along the columns (6) of micro-reaction chambers (10) and arranged such that there is one supply channel (4) between adjacent columns (6). The micro-reaction chambers (10) in the columns (6) are arranged such that the chamber inlets (10*a*) of a column are in fluid contact with the same supply channel (4) and the chamber outlets (10*b*) are in fluid contact with the supply channel (4) adjacent to the supply channel (4) arranged in fluidic contact with the chamber inlets (10*a*). Further, the plurality of supply channels (4) comprises a first end supply channel (4*a*) arranged for supplying fluid to a first end column (6*a*) of the micro-reaction chambers (10)
(Continued)

and a second end supply channel (4b) arranged for draining fluid from the second, opposite, end column (6b) of said micro-reaction chambers (10); and wherein the micro-reactor (1) further comprises at least one reagent inlet (8) in fluid contact with the first end supply channel 4a and a reagent outlet (9) in fluid contact with the second end supply channel such that reagents introduced to the at least one reagent inlet (8) fill the plurality of micro-reaction chambers (10) in a second direction (D2) along the rows (7) of micro-reaction chambers (10) to the reagent outlet (9).

20 Claims, 4 Drawing Sheets

(52) U.S. Cl.
CPC ................ *B01J 2219/00896* (2013.01); *B01L 2300/0864* (2013.01); *B01L 2300/0883* (2013.01); *B01L 2300/165* (2013.01); *B01L 2400/0406* (2013.01)

(56) References Cited

U.S. PATENT DOCUMENTS

| | | | |
|---|---|---|---|
| 9,914,968 B2* | 3/2018 | Chiang | B01L 3/502 |
| 2010/0068098 A1 | 3/2010 | Cheng et al. | |
| 2011/0143964 A1* | 6/2011 | Zhou | C07H 21/04 |
| | | | 506/40 |
| 2016/0121291 A1* | 5/2016 | Moonen | B01J 19/0006 |
| | | | 422/108 |
| 2016/0339427 A1* | 11/2016 | Wiktor | B01J 19/0046 |

* cited by examiner

ADDRESSABLE MICRO-REACTION CHAMBER ARRAY

TECHNICAL FIELD

The present inventive concept relates to the field of microfluidic devices, in particular to the field of micro-reactors capable of preventing contamination between individual reaction chambers present in the micro-reactor.

BACKGROUND

Microfluidic devices have been developed for a variety of applications in for example chemistry and biology and are used for manipulating extremely small volumes of fluids, such as at the nanoliter level or below. An application is the use of microfluidic devices to perform chemical reactions in a vast number of micro-reactors located in the microfluidic device, such as on a microfluidic chip.

DNA sequencing will be discussed in some detail to provide background of one potential application of the present invention. This does not imply that DNA sequencing is the only potential application of the present invention. It is also not the purpose here to provide a comprehensive review of the subject of DNA sequencing as this would be too lengthy. For brevity and conciseness, not every possible use of the present invention will be described here.

In whole genome sequencing, it is desired to know the sequence of the nucleotides in a patient's DNA. There are a number of techniques for determination of the DNA sequence. DNA sequencing by synthesis is an example of a class of techniques that works by taking a single-stranded DNA (ssDNA) template and building the double-stranded DNA (dsDNA) molecules by incorporating the nucleotides adenine (A), cytosine (C), guanine (G), and thymine (T) in a particular order by a reaction. The incorporation of a nucleotide into the ssDNA produces pyrophosphate (PPi), which is detectable using a number of methods. Pyrosequencing, for example detects light emitted during a sequence of enzymatic reactions with the PPi. So in order to determine which nucleotide is incorporated into the ssDNA, each nucleotide must typically be introduced one at a time into the reaction chamber at high levels of purity. Otherwise, an incorrect read of the nucleotide being incorporated might occur.

To perform whole genome sequencing by synthesis, the DNA is split into small fragments, each containing typically a few hundred or a few thousand base-pairs. These fragments are then spread over a large number of reactors so that the process of sequencing can be massively parallelized. To give the reader some sense of scale, there are approximately 3 billion base-pairs in the human genome so 3 million reactor cavities are nominally required if the DNA is fragmented into 1000 base-pair segments and each reactor contains a distinct, different DNA fragment. In reality more reactions are required to ensure good data integrity when piecing back together the DNA from reading the nucleotide sequence from the multiple DNA fragments. Furthermore, it is difficult to ensure that each reactor is loaded with a distinctly, different fragment of the whole genome. The reasons for this are not highly relevant to the invention so will not be discussed further.

The classical technology for whole genome sequencing utilizes a relatively large flow cell which contains a large number of reaction cavities. The ssDNA template fragments are typically either covalently bound directly to the surface of each reaction cavity or bound to beads that are placed into each reaction cavity. Because the flow cell is large, it takes some time to fill the flow cell with a nucleotide and then evacuate the flow cell of the nucleotide using a wash buffer before introduction of the next nucleotide. So the rate at which nucleotides can be introduced and incorporated into the ssDNA is relatively slow. Also, a large number of reagents are typically used during this sequencing operation.

The process of introducing the reagents sequentially can be sped up by introducing the separate reagent inlets and outlet channel very close to each reaction chamber by using microfluidic channels. Here, the problem is preventing diffusion of unwanted reagents (nucleotides in the case of DNA sequencing) into the reaction chamber, which reduces the purity of reagents and can cause unwanted reactions to occur (incorporation of the wrong nucleotide in the case of DNA sequencing).

There is however a challenge in controlling fluid behaviour in small channels to supply reagents and buffer solutions to micro-reactors present in the fluidic device. Solutions exist that take into account both the physical properties of the fluid, the contents of the fluid and the dimensions of the micro fluidic channels.

A micro-reactor typically comprises a plurality of micro-reaction chambers that are organized in a pattern-wise fashion. Within these micro-reaction chambers, specific locally constricted reactions can take place, conducted in solution and/or by interaction with the surface layer of the micro-reaction chamber. To avoid signal contamination between neighbouring wells, each micro-reaction chamber should be sealed off from each other prior to the signal generation.

One way to solve the contamination issue is by means of an immiscible phase, typically oil or air, which separates the individual micro-reaction chambers and prevents fluid from a first well to enter a second well. However, using an immiscible phase to separate the wells is cumbersome and requires additional reaction steps as the immiscible phase needs to be pumped into the micro-reactor. During this step, a common issue is the entrapment of air bubbles in the immiscible phase, which reduces the number of useable wells. Further, the operator needs to ensure that each micro-reaction chamber is protected by an immiscible phase to guarantee that there is no contamination between the individual micro-reaction chambers.

Hence, there is a need in the art for improved devices and method for decreasing the risk of contamination within micro-reaction chambers in a microfluidic device.

SUMMARY

It is an object of example embodiments to at least partly overcome one or more limitations of the prior art. In particular, it is an object of example embodiments to provide a microreactor for decreasing the risk of contamination within micro-reaction chambers.

In a first aspect of the invention, there is provided a micro-reactor adapted to host chemical reactions having at least one microfluidic layer, the micro-reactor comprising
  a fluid inlet and a fluid outlet;
  a plurality of micro-reaction chambers arranged in rows and columns, each micro-reaction chamber comprising a chamber inlet and a chamber outlet;
  a plurality of supply channels for supplying fluid from the fluid inlet to the micro-reaction chambers and further arranged for draining the micro-reaction chambers to the fluid outlet, the supply channels extending in a first direction (D1) along the columns of micro-reaction chambers and arranged such that there is one supply channel between adjacent columns;

and further wherein the micro-reaction chambers in the columns are arranged such that the chamber inlets of a column are in fluid contact with the same supply channel and the chamber outlets are in fluid contact with the supply channel adjacent to the supply channel arranged in fluidic contact with the chamber inlets, and wherein the plurality of supply channels comprises a first end supply channel arranged for supplying fluid to a first end column of the micro-reaction chambers and a second end supply channel arranged for draining fluid from the second, opposite, end column of the micro-reaction chambers;

and wherein the micro-reactor further comprises at least one reagent inlet in fluid contact with the first end supply channel and a reagent outlet in fluid contact with the second end supply channel such that reagents introduced to the at least one reagent inlet fill the plurality of micro-reaction chambers in a second direction (D2) along the rows of micro-reaction chambers to the reagent outlet.

Direction D1 may be substantially perpendicular to direction D2.

Advantageously, according to the present disclosure, problems of the prior art related to the isolation of individual micro-reaction chambers is alleviated by designing the micro-reactor with supply channels and chambers as according to the microreactor of the first aspect. A first fluid may easily be injected into the microreactor and fill the plurality of micro-reaction chambers. Thereafter, when a second fluid that is immiscible with the first fluid is pumped through the micro-reactor, the first fluid contained in the micro-reaction chambers can be partitioned and the micro-reactors may be separated from one another. In other words, after this isolation process, each micro-reaction chamber will be filled with the first fluid but separated from one another by the second fluid.

Consequently, due to the configuration of supply channels and micro-reaction chambers, a first aqueous liquid may be introduced to the chambers and when filling with an immiscible (oil) phase, capillary forces may prevent the oil from entering the microreactors and the oil will only preferentially fill the supply channels, thereby allowing the first fluid filling the microreactors to remain and isolating the fluid in microreactors. The microreactor of the first aspect thus provides individual chemical reactions to take place in the each microchamber with little risk of contamination.

Thus, in embodiments of the first aspect, the micro-reaction chambers and supply channels are configured such that when introducing a first fluid to the micro-reaction chambers and thereafter a second fluid, the second fluid being immiscible with the first fluid, capillary forces prevent the second fluid from entering the micro-reaction chambers.

In embodiments, the designing of the cross-sectional dimensions of the supply channels and micro-reaction chambers involves designing the cross-sectional areas such that the cross-sectional area of the supply channel has an area which exceeds the cross-sectional area of the inlet of the micro-reaction chamber.

As used herein, "micro-reactor" is intended to denote a structure comprising at least one supply channel having an inlet and an outlet, and at least one micro-reaction chamber intended to host chemical reactions. The micro-reactors disclosed herein are adapted to be positioned on a microfluidic device in either serial or parallel networks. A microfluidic device may comprise a plurality of micro-reactors. A micro-reactor may be present on a lab-on-chip device that allows automation and high-throughput screening. The micro-reactors may be configured to handle small volumes of fluid, such as nanoliter volumes or picoliter volumes.

The term "micro-reaction chamber" used herein should be understood as a channel suitable for hosting chemical reactions. The terms "micro-reaction chamber" and "microwell" may be used interchangeably throughout the present disclosure. The micro-reaction chambers comprise an inlet and an outlet connected to supply channels. The micro-reaction chambers are adapted to be loaded with a sample to be studied, and may comprise a functionalized surface adapted to bind the sample in place during a reaction assay. The samples may for example be target molecules such as proteins, but other types of samples may also be contemplated such as, but not limited to, cells or microorganisms. Each micro-reaction chamber present in the micro-reactor may, in principle, be loaded with an individual sample different from the samples loaded into the neighbouring micro-reaction chambers. Thus, the micro-reaction chambers may comprise a functionalized surface suitable for binding to the sample intended to be studied therein.

As used herein, the term "fluid" may refer to a liquid.

A micro-reactor according to the present invention may comprise at least one micro-reaction chamber. Preferably, the micro-reactor comprises at least a plurality of micro-reaction chambers, such as at least 4 micro-reaction chambers. In some examples the micro-reactor comprises more than 10 micro-reaction chambers, such as more than 100 micro-reaction chambers, such as more than 1000 micro-reaction chambers.

The surface properties of the supply channel and the micro-reaction chambers are generally the same. Preferably the micro-reactor is made of a hydrophilic material, such as a hydrophilic silicon material, a hydrophilic glass material, a hydrophilic metal or a hydrophilic polymer material.

In embodiments of the first aspect, the inner surface of at least one micro-reaction chambers are functionalized.

As an example, the inner surface of at least one micro-reaction chamber is oleophobic.

In embodiments of the first aspect, the chamber inlets are configured such that fluid transport from a supply channel to a micro-reaction chamber via the chamber inlet occurs mainly by capillary forces.

As an example, the supply channels may have a first cross-sectional area $A_s$ and the chamber inlet of the micro-reaction chambers may have a second cross-sectional area $A_c$. The supply channels and the micro-reaction chambers may be configured such that the first to second cross-sectional area ratio ($A_s:A_c$) is such that fluid transport from the supply channels to at least one micro-reaction chamber of the plurality of micro-reaction chamber occurs mainly by capillary forces.

As an example, the supply channels may further have a first perimeter of the channel cross-section $P_s$ and the micro-reaction chambers may further have a second perimeter of the channel cross-section $P_c$, wherein the first to second cross-sectional area ratio ($A_s:A_c$) is larger than the first to second perimeter ratio ($P_s:P_c$).

Designing the micro-reactor such that it allows for the fluid transport from the supply channel to the micro-reaction chambers to occur mainly by capillary forces, several problems associated with prior art devices may be alleviated. For one, this allows for a passive flow of fluids capable of wetting the supply channel and the micro-reaction chamber, into the micro-reactors. After the micro-reaction chamber have been filled, the capillary forces also pin a fluid meniscus at the outlet of the micro-reaction champers up until a certain fluidic pressure, thus preventing fluid from leaving the micro-reaction chamber before the complete supply channel has been filled.

The term "mainly by capillary forces" denotes that the supply channels and the micro-reaction chambers can be filled using passive flow only.

Furthermore, the capillary forces allow for introduction of reagents present in fluids capable of wetting the supply channel and the micro-reaction chamber, into the micro-reaction chambers, wherein the introduction is governed by advection rather than diffusion. This is advantageous in that is provides for a quick introduction and homogenous distribution of reagents in the micro-reaction chambers.

Additionally, the capillary forces also inhibit the introduction of a second fluid that does not wet the supply channel and the micro-reaction chamber into the supply channel of the micro-reactor after the first fluid and/or a reagent has been introduced into the chambers. A pressure greater than the capillary pressure in the supply channel has to be added to the second fluid to force it into the supply channel. As the second fluid is being driven through the supply channel, a fluid meniscus formed by the interface of the second fluid and first fluid (capable of wetting the micro-reaction chamber), stays pinned at the inlets and the outlets of the micro-reactions chambers due to capillary forces, thus preventing the second fluid (less capable of wetting the micro-reaction chambers) from entering the micro-reaction chambers. Thus, the second fluid stays in the supply channel and prevents diffusion between the individual micro-reaction chambers, thus minimizing the risk of contamination between the individual micro-reaction chambers.

In some example embodiments, the cross-sectional area $A_s$ is larger than the cross-sectional area $A_c$. This is advantageous in that it promotes the fluid transport from the channel to the at least one micro-reaction chamber to occur mainly by capillary forces. In particular, fluids capable of wetting the inner surfaces of the supply channel and the micro-reaction chambers will be transported from the supply channel to the micro-reaction chamber by capillary force action. $A_c$ may have a size to generate a capillary pressure higher than the sum of the filling pressure and the capillary pressure generated by $A_s$. In some examples, ratio of $A_s:A_c$ is at least 2:1, such as at least 3:1, more preferably 4:1.

In some examples the filling pressure is in the range of 0-1 bar. Thus, the micro-reactor, such as the inlet and supply channels, may be configured for receiving a filling fluid of 0-1 bar. Without wishing to be bound by any specific scientific theory, the capillary pressure of the chamber $Press_c$ is a function of the chamber width B and the chamber height h as follow by equation 1:

$$Press_c = 2\gamma \cos\theta (1/B + 1/h) \quad (1),$$

in which $Press_c$ is the capillary pressure at the inlet of the channel, $\gamma$ is the surface tension coefficient of a fluid present in the microreactor, $\theta$ is the contact angle at the fluid/gas interface. Thus, the cross-sectional area of the chamber $A_c$ (or its width and height) should preferably be small enough such that a sufficiently large capillary pressure can be formed during filling. Herein, the term "sufficiently large capillary pressure" denotes a capillary pressure of the micro-reaction chambers that is larger than the capillary pressure of the supply channel plus the filling pressure used when providing a fluid to the microreactor. Furthermore, the capillary pressure provided prevents a second fluid not capable of wetting the inner surface of the microreactor from entering the micro-reaction chambers, thus isolating the fluids present in the micro-reaction chambers from each other.

In some example embodiments, at least one micro-reaction chamber comprises an elongate fluid path. An elongate fluid path may be defined as a path between the inlet and the outlet that is longer than a straight line between the inlet and the outlet. The micro-reaction chamber may have the shape of a channel. The micro-reaction chamber may be at least 1 micron in length, such as approximately a few mm in length. The elongate fluid path may have a winding shape. A winding shape is advantageous in that it is space efficient. By choosing a winding fluid path, the overall footprint of the micro-reactor can be minimized. Since the materials used in microfluidic design are rather expensive, a low overall footprint minimizes costs.

In examples, the ratio of the cross-sectional dimensions of the supply channel and the cross-sectional dimensions of the micro-reaction chamber is such that the supply channel yields a capillary pressure which is less than the capillary pressure of the of the micro-reaction chamber.

In some example embodiments, the at least one elongate fluid path comprises at least two turns of more than 90 degrees. The winding path may thus be twisting and changing direction, such as changing direction at least 90 degrees more than two times. One shape that changes direction at least 90 degrees more than two times is an s-like shape. An s-like shape has rounded corners, but sharp corners may also be contemplated.

Microreactors may be constructed in several fluidic layers stacked on top of each other. According to some example embodiments, the supply channel and the plurality of micro-reaction chambers are arranged in the same microfluidic layer. This means that the supply channel and micro-reaction chambers all have the same height. Is should also be understood that the height is substantially the same throughout the fluidic layer. Thus, the difference of cross-sectional area between the supply channel and the inlet of the micro-reaction chamber is governed by the difference between the supply channel width and the width of the inlet of the micro-reaction chambers. It should further be understood that the plurality of micro-reaction chambers all have substantially the same shape and dimensions.

Thus, when the micro-reaction chambers and the supply channel are provided in the same fluidic layer, the relationship between the cross-sectional areas of $A_s$ and $A_c$ may depend only on their relationship between the width of the supply channel and the width of the inlet of the micro-reaction chambers.

In some example embodiments, the inner surfaces of the micro-reactor comprise a material that is wettable by a fluid adapted to be used in the micro-reactor, wherein the fluid is a sample fluid and/or a reagent fluid. The inner surfaces of the micro-reactor may for example be hydrophilic.

As used herein, a "hydrophilic surface" should be understood as surface having hydrophilic properties. "Hydrophobic surface" should be understood as a surface having hydrophobic properties. The hydrophilic surface may further have oleophobic properties.

A hydrophilic surface is wettable by aqueous fluids. An oleophilic surface is wettable by oleaginous fluids. Examples of materials suitable for the micro-reactor of the present disclosure is silicon, glass and various polymer materials. Metals may also be contemplated. The material of the supply channel and the micro-reaction chambers may be the same.

In some examples, the micro-reactor is made of a material selected from the group consisting of silicon, glasses, polymers and metals.

The phrase "capable of wetting" is, in the present disclosure intended to denote that the contact angle θ at which the liquid—vapor interface meets the solid-liquid interface is equal to or less than 90°. Thus, a fluid having a contact angle θ of more than 90° could be considered to not be capable of wetting the inner surfaces of the micro-reactor by capillary forces alone.

In some example embodiments, the supply channel is further adapted to act as a waste channel. The outlets of each micro-reaction chamber may be connected to the fluid supply channel. When the micro-reactor is flushed at a sufficient pressure with a cleaning fluid, such as a water, a buffer liquid or air, the content of each micro-reaction chamber will exit through their respective outlets. When the supply channel is further adapted to act as a waste channel, each outlet may be connected to the supply channel so that fluid which exits the micro-reaction chambers is transported to the supply channel outlet via the supply channel. Thus, each inlet and each outlet of the micro-reaction chambers may be connected to the supply channel. This can be achieved in various ways. One way of achieving this is by providing the micro-reaction channels in a row. In one illustrative example, the supply channel may run parallel to the row on each sides of the row, and comprise at least one 180 degrees turn. The supply channel preferably has its inlet and outlet on opposite sides of the row of micro-reaction chamber. The micro-reaction chambers may be arranged such that their inlets are in fluid connection with the supply channel on the side of the row closest to the supply channel inlet. The outlets of the micro-reaction chambers may be in fluid connection with the supply channel on the side of the row closest to the supply channel outlet.

In some example embodiments, the plurality of micro-reaction chambers is arranged in an array. An array preferably comprises at least two rows of micro-reactors, but may also comprise more, such as 4, 10, hundreds or even thousands of rows. The array may comprise $N_1$ rows and $N_2$ columns, wherein $1 \leq N_1 \leq 1000$ and $1 \leq N_2 \leq 1000$, $N_1$ and $N_2$ may be equal, but the scope of the present disclosure also includes examples wherein $N_1 < N_2$ or $N_1 > N_2$. When the micro-reaction chambers are arranged in an array, the supply channel may be provided such that it serpentines around each row (or column, depending on the orientation of the micro-reactor). Thus, the supply channel may comprise as many 180 degree turns the number of rows do.

In some example embodiments, the micro-reactor further comprises a plurality of supply channels, wherein each supply channel has a fluid inlet and a fluid outlet and wherein each micro-reaction chamber has a fluid inlet fluidly connected to a first one of the supply channels and a fluid outlet fluidly connected to the second one of the supply channels. The supply channels may be connected in parallel such that the supply channels may be simultaneously addressed by fluid from the fluid inlet.

The supply channels may be fluidly connected to a fluid phase inlet bus and fluid phase outlet bus, wherein the fluid phase inlet bus is arranged so that the plurality of channels is simultaneously addressed by the inlet bus, and wherein the fluid outlet bus is arranged so that the outlet bus is simultaneously addressed by the plurality of chambers.

Consequently, in embodiments of the first aspect, the micro-reactor further comprises
an inlet bus and an outlet bus, and wherein
the plurality of supply channels are fluidly connected to the inlet bus via a plurality of fluid inlet pressure drop elements such that the plurality of supply channels can be simultaneously addressed by a fluid supplied to the fluid inlet, and wherein the plurality of supply channels are fluidly connected to the outlet bus such that the plurality of supply channels can be simultaneously drained via the fluid outlet.

The fluid inlet bus is thus connected to the supply channels and to the fluid inlet, i.e. in the fluid path between the fluid inlet and the supply channels. The outlet bus is connected to the supply channels and the fluid outlet, i.e. in the fluid path between the supply channels and the fluid outlet.

As an example, the fluid inlet pressure drop elements may be elements that increase the fluid impedance and may be selected from channels, constrictions and porous structures By providing a fluid phase inlet and outlet bus, a higher number of micro-reaction chambers can be provided. Each channel in the plurality of channels may be in fluid connection with both the inlet bus and the outlet bus. The supply channels are preferably connected in parallel to the inlet bus. The fluid inlet bus pair may be capable of handling both water-based fluids and oil-based fluids, respectively.

Herein, the term "simultaneously addressed" refers to that the plurality of chambers is filled simultaneously. Stated differently, this allows fluid to enter the channels in the plurality of channels simultaneously.

The micro-reactor may further comprise a reagent inlet bus and a reagent outlet bus. Thus, in embodiments of the first aspect, the micro-reactor comprises a plurality of reagent inlet pressure drop elements in fluid contact with the first end supply channel and a plurality of reagent outlet channels in fluid contact with the second end supply channel; and wherein the micro-reactor further comprises
a reagent inlet bus and a reagent outlet bus, and wherein the plurality of reagent inlet pressure drop elements are fluidly connected to the reagent inlet bus such that the plurality of reagent inlet pressure drop elements can be simultaneously addressed by a reagent supplied to the reagent inlet, and wherein the plurality of reagent outlet channels are fluidly connected to the reagent outlet bus such that the plurality of reagent outlet channels can be simultaneously drained via the reagent outlet.

The reagent inlet pressure drop elements may be elements that increase the fluid impedance and are selected from channels, constrictions and porous structures.

The reagent inlet and outlet bus are preferably adapted to handle various types of reagents adapted to chemically react with samples provided in the micro-reaction chambers. The reagents are preferably provided in a solution, preferably a solution capable of wetting the inner surfaces of the supply channels and the micro-reaction chambers. By providing a fluid inlet and outlet bus and a reagent inlet and outlet bus, isolation of the individual micro-reaction chambers can be provided in a quick and efficient manner. The reagent inlet and outlet bus may be connected in parallel to at least one fluid supply channel. If the reagent is present in a solution having a similar wettability with regard to the inner surfaces of the micro-reactor, as a fluid present in the fluid inlet bus, the micro-reaction channels will be in fluid connection with each other such that the reagents introduced via the reagent inlet bus can be homogenously distributed in the micro-reaction chambers when the fluid present in the fluid inlet bus has been introduced into the supply channels. After the reagents has been introduced and distributed in the micro-reaction chambers, the individual micro-reaction chambers can be isolated from each other by introduction of a fluid having a different wettability of the inner surfaces of the micro-reactor than the first fluid and the reagents. Such a second fluid may be immiscible with the fluid in which the reagents are supplied. Due to the configuration of the micro-reactor a fluid not capable of wetting the inner surfaces of the micro-reactor may not be able to enter the micro-reaction chambers. The fluid not capable of wetting the inner surfaces of the micro-reactor will thus be distributed only in the supply channels only and will thus efficiently seal the micro-reaction chambers. Thus, chemical reactions may take place in the micro-reaction chambers without the risk of contaminations from one chamber to the other. After the reactions have taken place, a second fluid capable of wetting the inner surfaces of the micro-reactor may be introduced into the micro-reactor via the fluid inlet bus. This fluid will then replace the fluid not capable of wetting the inner surfaces of the micro-reactor in the supply channels, and the micro-reaction chambers will once again be in communication with each other. The fluid not capable of wetting the inner surfaces of the micro-reactor will be flushed out via the fluid outlet bus. When the micro-reaction chambers are once again in fluid connection, yet another reagent may be added. Alternatively, the reagent inlet bus may be provided with a cleaning fluid which is distributed to the micro-reaction chambers and supply channels, in order to remove traces of reagents from the micro-reactor.

In some example embodiments, at least one of the micro-reaction chambers is loaded with a sample to be studied. The samples may preferably be biological samples, such as but not limited to cells, tissue, blood, microorganisms. The samples may bind to the surface of the micro-reaction chamber. The samples may be studied by for example droplet PCR (dPCR) or digital ELISA.

In some example embodiments, the inner surfaces of at least one micro-reaction chamber are functionalized. In the present disclosure, the term "functionalized" is intended to denote the act of modifying a surface bringing physical, chemical or biological characteristics different from the ones originally found on the surface of a material. The functionalized surface may be modified such that the samples can bond to the surfaces of the micro-reaction chambers, to ensure that they stay in place when the micro-reactor is used for studying the samples.

In embodiments, the micro-reactor has a first state in which the micro-reactions chambers are in fluid connection with each other; and a second state in which the micro-reaction chambers are not in fluid connection with each other. The micro-reactor may enter the first state by provision of a fluid capable of wetting the inner surfaces of the micro-reactor, such as an aqueous solution (depending on the surface properties of the micro-reactor), into the micro-reactor. The fluid capable of wetting the inner surfaces of the micro-reactor will be homogenously distributed in the supply channel(s) and in each micro-reaction chamber. The micro-reaction chambers will then be in fluid communication with each other. The micro-reactor may enter the second state by subsequent introduction of a fluid not capable of wetting the inner surfaces of the micro-reactor, such as an oleaginous solution, into the micro-reactor. As long as the fluid not capable of wetting the inner surfaces of the micro-reactor is provided with a pressure lower than a threshold pressure, the design of the micro-reactor will not allow the fluid not capable of wetting the inner surfaces of the micro-reactor to enter the micro-reaction chambers. Thus, the fluid not capable of wetting the inner surfaces of the micro-reactor will be distributed in the supply channel(s) such that it prevents the micro-reaction chambers from fluid communication with each other.

As a configuration of the first aspect of the invention, there is provided a micro-reactor adapted to host chemical reactions having at least one microfluidic layer, the micro-reactor comprising a microfluidic supply channel having a fluid inlet and a fluid outlet, and a plurality of micro-reaction chambers each being in fluid connection with the supply channel. Each micro-reaction chamber comprises a fluid inlet adapted to receive fluid from the supply channel, and a fluid outlet. The supply channel has a first cross-sectional area $A_s$ and the fluid inlet of each micro-reaction chamber has a second cross-sectional area $A_c$, wherein the first to second cross-sectional area ratio ($A_s:A_c$) is determined such that fluid transport from the supply channel to at least one micro-reaction chamber of the plurality of micro-reaction chamber occurs mainly by capillary forces.

By designing the cross-sectional dimensions such that the supply channel yields a capillary pressure which is less than the capillary pressure of the of the micro-reaction chamber, individual micro-reaction chambers can be filled by capillary forces to minimize problem associated with creating air bubbles when initially filling the micro-reaction chambers with fluid.

As a second aspect of the present disclosure, there is provided a method of for performing a chemical reaction at a micro-reactor comprising the steps of
 a) providing a micro-reactor according to the first aspect above;
 b) supplying a first fluid via the fluid inlet or reagent inlet to the supply channels to load the micro-reaction chambers with the first fluid;
 c) supplying a first reagent via the reagent inlet to the reagent inlet channels to load the micro-reaction chambers with the reagent;
 d) supplying a second fluid via the fluid inlet to the supply channels, wherein the second fluid is immiscible with the first fluid; thereby isolating the plurality of micro-reaction chambers from fluid communication with each other, and
 e) performing isolated reactions in the isolated plurality of micro-reaction chambers; and
 f) supplying a fluid via the fluid inlet to remove the second fluid.

Micro-reactors according to example embodiments of the present disclosure may be used in a method which is advantageous in that alleviates several problems associated with the prior art. For example, an example method according to the present disclosure provides efficient isolation of the individual micro-reaction chambers, which alleviates the problems associated with contamination from one micro-reaction chamber to the other.

The first fluid and the first reagent may have the same or similar wettability with regard to the supply channel and the micro-reaction chambers. That the reagent has the "same or similar wettability" as the first fluid denotes that if the first fluid is capable of wetting the inner surfaces of the microreactor, the reagent is also capable of wetting the inner surfaces of the microreactor. Consequently, if the first is not capable of wetting the inner surfaces of the microreactor, the reagent is also not capable of wetting the inner surfaces of the microreactor.

Means for supplying a fluid to a fluid inlet bus are known in the art. Preferably, the steps of supplying are performed using a fluid pump adapted to pump small volumes of fluid at a defined pressure and speed.

In some example embodiments, the step b and/or c may be repeated such that a plurality of reagents can be supplied to the micro-reactor. The steps b and could also be considered to make up a flush protocol. A step of supplying cleaning fluid may also be performed after step c, in order to clean the micro-reaction chambers before a new reagent is provided.

In embodiments of the second aspect, the method is further comprising closing the fluid inlet and the fluid outlet during step c).

In embodiments of the second aspect, the method is further comprising supplying additional reagents via the reagent inlet to load the micro-reaction chambers with the additional reagents in step c) or after step f).

In embodiments of the second aspect, the second fluid is supplied using a pressure driven flow.

In embodiments of the second aspect, the first fluid is an aqueous solution and wherein the second fluid is an oil.

Accordingly, the second aspect of the invention provides a method of for performing a chemical reaction at a micro-reactor comprising the steps of
   a) providing a micro-reactor according to the first aspect;
   b) supplying an aqueous fluid via the fluid inlet or reagent inlet to the supply channels to load the micro-reaction chambers with the aqueous fluid;
   c) supplying a first reagent via the reagent inlet to load the micro-reaction chambers with the reagent;
   d) supplying an oil via the fluid inlet to the supply channels, wherein the oil is immiscible with the aqueous fluid; thereby isolating the plurality of micro-reaction chambers from fluid communication with each other, and
   e) performing isolated reactions in the isolated plurality of micro-reaction chambers; and
   f) supplying a fluid via the fluid inlet to remove the oil.

In some examples, the reagent is provided as part of a PCR-assay. In a PCR-assay, several reagents may be introduced in sequence into the micro-reactor.

In some example embodiments, the fluid inlet of step b) is connected to a fluid inlet bus as discussed herein above. Thus, all channels of the microreactor can be simultaneously addressed with the first fluid.

In some example embodiments, the inlet of step c) connected to a reagent inlet bus as discussed herein above.

In some example embodiments, the step d) is performed using supply via an inlet bus. Thus, all supply channels can be simultaneously addressed by the second fluid.

In a third aspect of the invention, there is provided a microfluidic device or system for isolation of individual micro-reaction chambers comprising a micro-reactor as described with reference to the first aspect. In some examples such a microfluidic device may comprise a plurality of microreactors.

BRIEF DESCRIPTION OF THE DRAWINGS

The above, as well as additional objects, features and advantages of the present disclosure, will be better understood through the following illustrative and non-limiting detailed description, with reference to the appended drawings. In the drawings like reference numerals will be used for like elements unless stated otherwise.

DETAILED DESCRIPTION

Figure 1A:
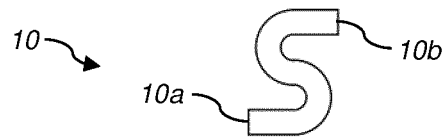
FIG. 1a shows a schematic illustration of a micro-reaction chamber of the present disclosure.

FIG. 1a shows a schematic example of a micro-reaction chamber 10 of a micro reactor of the present disclosure. The micro-reaction chamber 10 is in this embodiment S-shaped and has a chamber inlet 10a and a chamber outlet 10b.

Figure 1B:
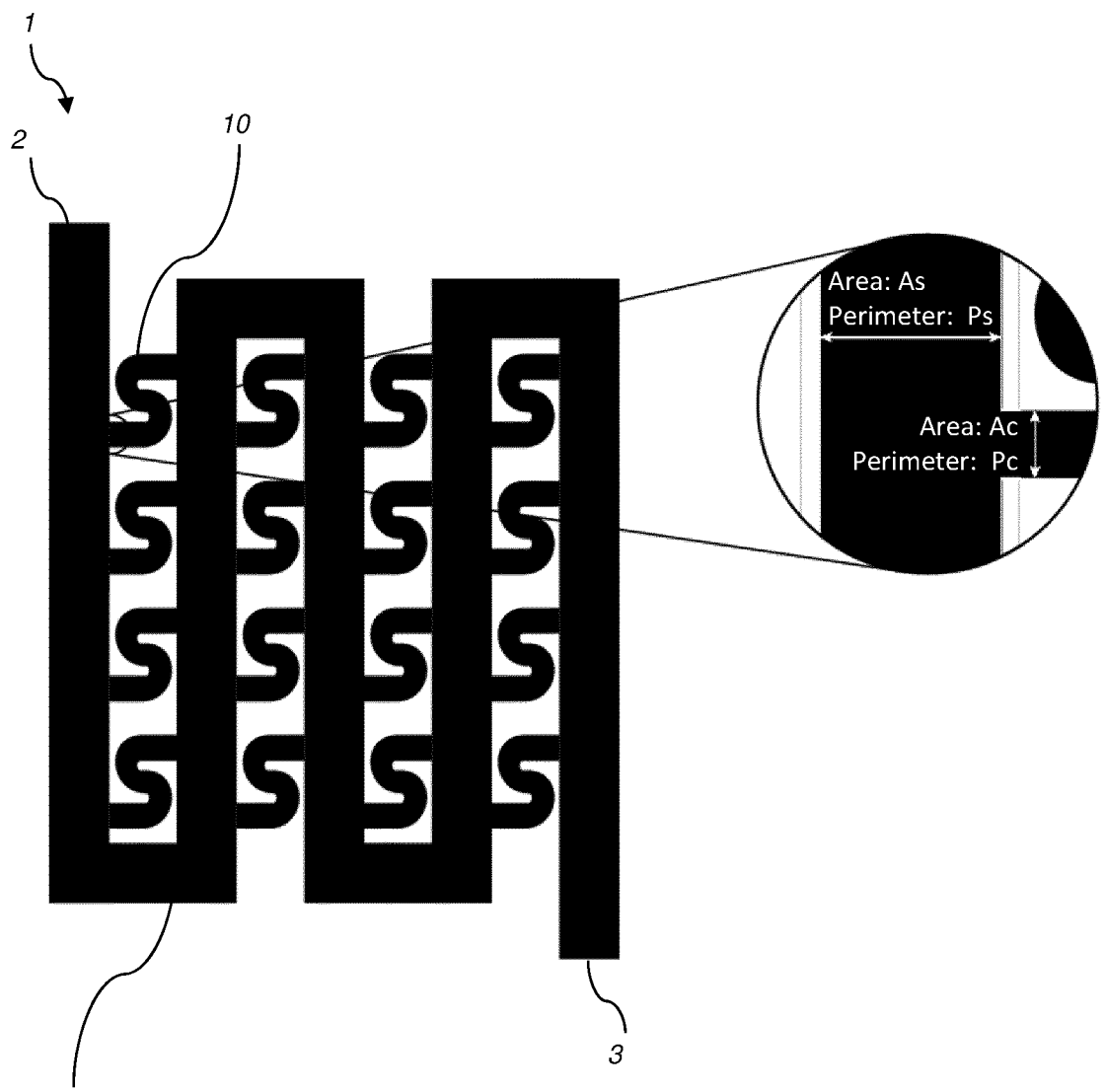
FIG. 1b shows a schematic illustration of a micro-reactor according to example embodiments of the invention.

FIG. 1b shows an illustrative example of a micro-reactor 1 according to the present disclosure. Here, the micro-reactor 1 has 16 micro-reaction chambers 10 for facilitating chemical reactions. The 16 chambers 10 are arranged in an array having 4 rows and 4 columns. It is readily understood by the skilled person that the an 4×4 array is just a representation for better understanding of the inventive concept. In practice, a micro-reactor 1 may comprise hundreds or even thousands of micro-reaction chambers 10 arranged in an array.

The micro-reactor 1 shown in FIG. 1b also comprises a microfluidic supply channel 4 in fluid connection with each micro-reaction chamber 10. Here, each micro-reaction chamber 10 has an inlet and an outlet in fluid connection with the supply channel 4. The supply channel 4 is serpentined around each column of the array in order to provide a space-efficient arrangement and to provide quick and efficient loading. The supply channel 4 is provided with a fluid inlet 2 and a fluid outlet 3.

In FIGS. 1a and 1b, the micro-reaction chambers 10 have a general S-shape and comprise an inlet 10a and an outlet 10b connected via an elongate reaction channel. In this example, the supply channel 4 and the micro-reaction chambers 10 are provided in the same fluidic layer. This means that the supply channel 4 and the micro-reaction chambers 10 have the same height. The inlet 10a of the micro-reaction chamber 10, and preferably also the outlet 10b of the micro-reaction chamber 10 preferably has a cross-sectional area $A_c$ and the supply channel 4 has across-sectional area $A_s$. Further, as illustrated in FIG. 1b, the supply channel 4 has a perimeter $P_s$, whereas the inlet 10a of a micro-reaction chamber 10 has a perimeter $P_c$. The ratio between the supply channel 4 area $A_s$ and the area of the inlet $A_c$ of the micro-reaction chamber 10 allows the fluid flow into the chambers 10 from the supply channel 4 to occur mainly by capillary forces. By choosing the ratio $A_s:A_c$, the flow of aqueous fluids into the reaction chambers 10 can be governed by capillary forces even at substantially rapid filling speeds and pressures. As an example, the first to second cross-sectional area ratio ($A_s:A_c$) is larger than the first to second perimeter ratio ($P_s:P_c$).

Furthermore, when another aqueous solution is introduced into the supply channel 4 via the inlet 2, such a configuration allows for a substantial mass transport within the micro-reaction chamber 10 that is governed by advection rather than diffusion. Thus, a continuous supply of reagents throughout each micro-reaction chamber 10 can be achieved.

In example embodiments in which the outlets of the micro-reaction chambers 10 also have the area $A_c$, the capillary forces will allow the fluid to stay in the micro-reaction chambers 10 by pinning of a fluid-air meniscus at the outlet (and inlet) of each micro-reaction chamber 10. This is advantageous when a separate phase fluid not capable of wetting the inner surfaces of the micro-reaction chambers, such as an oil phase fluid, is introduced into the supply channel 4 in that it allows the user to replace the supply channel content while leaving the micro-reaction chambers 10 filled with the first, aqueous fluid, which is capable of wetting the inner surfaces of the micro-reactor. In other examples the inner surfaces of the micro-reactor may be chosen such that oleaginous fluids are capable of wetting the inner surfaces of the micro-reactor and that aqueous fluids are not capable of wetting the inner surfaces of the micro-reactor.

Figure 2A:
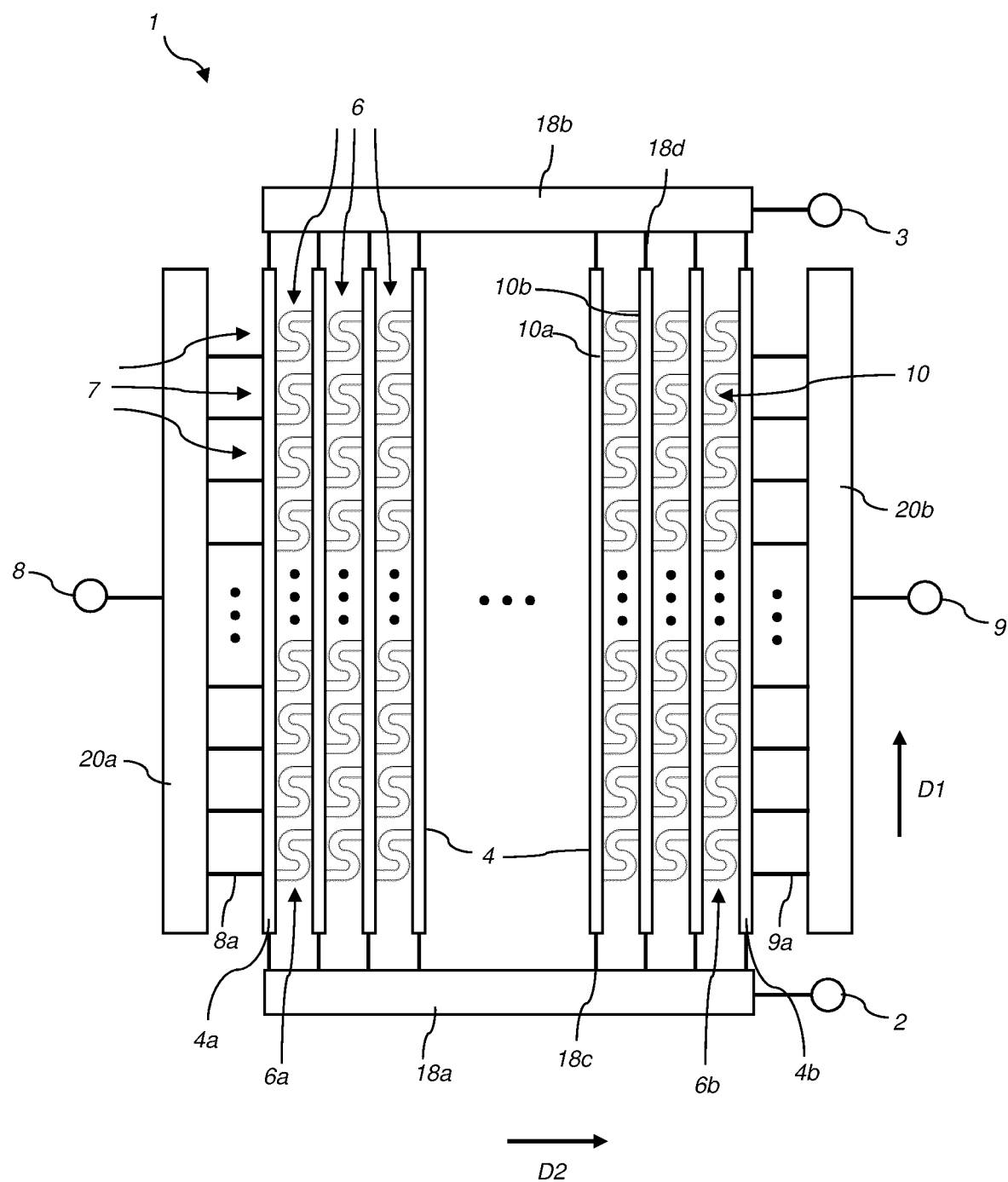
FIG. 2a shows a schematic illustration of a micro-reactor comprising bus pairs according to example embodiments of the invention.
Figure 2B:
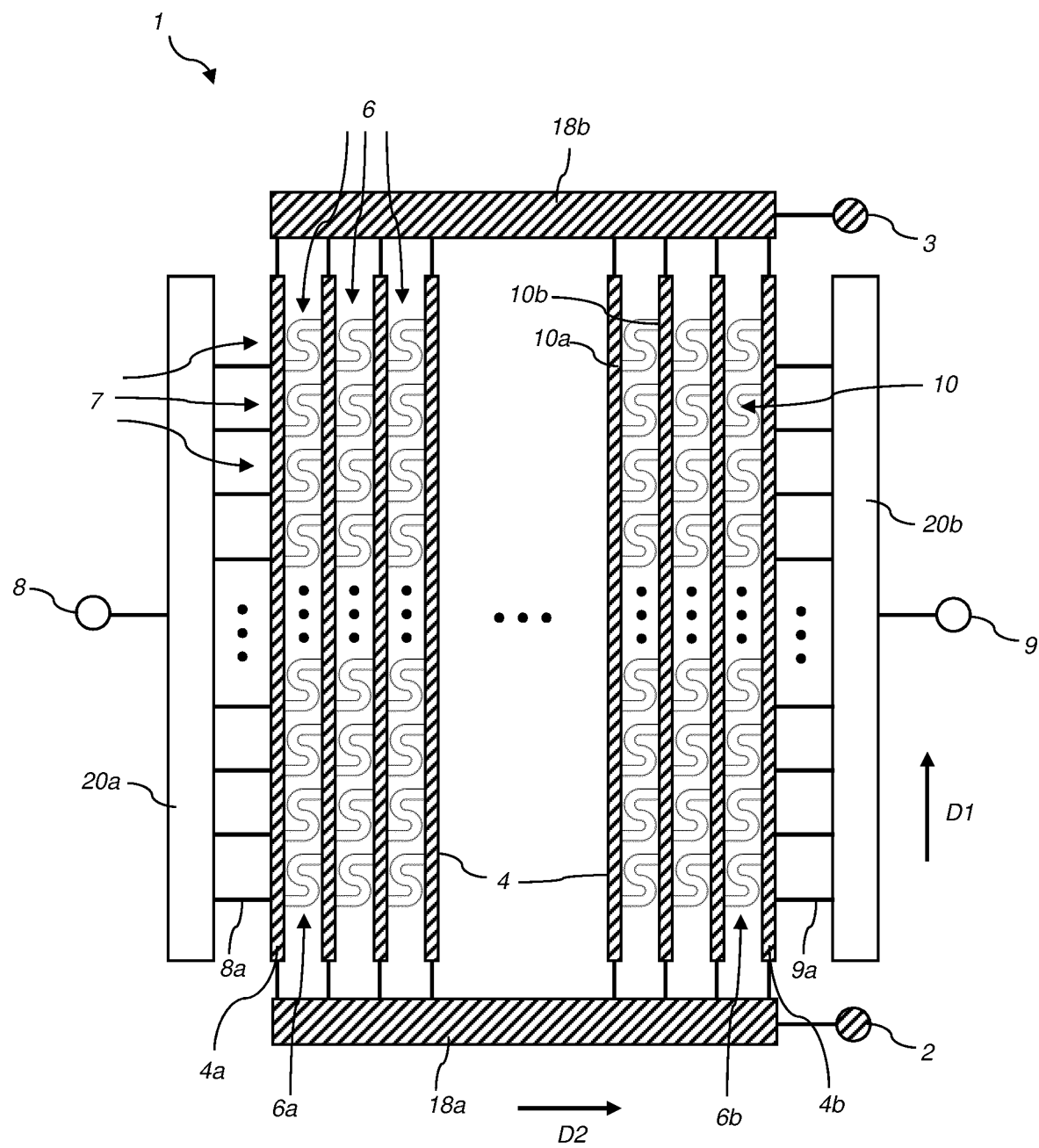
FIG. 2b shows micro-reactor of FIG. 2a when individual micro-reaction chambers have been sealed off using an injected oil phase.

A micro-reactor 1, composed of $N_1$ rows by $N_2$ columns of micro-reaction chambers 10 is further illustrated in FIGS. 2a and 2b.

The micro reactor 1 comprises a plurality of supply channels 4 for supplying fluid to from the fluid inlet 2 to the micro-reaction chambers 10.

The supply channels 4 are further arranged for draining the micro-reaction chambers 10 to the fluid outlet 3. Aw illustrated in FIG. 2a, the supply channels 10 extend in a first direction (D1) along the columns 6 of micro-reaction chambers 10 and arranged such that there is one supply channel 4 between adjacent columns 6. Thus, there is a single supply channel 4 extending in direction D1 between the columns of micro-reaction chambers 10. Also, there is a single column 6 of chambers 10 between two adjacent supply channels 4.

The micro-reaction chambers 10 in the columns 6 are further arranged such that the chamber inlets 10a of a column are in fluid contact with the same supply channel 4 and such that the chamber outlets 10b are in fluid contact with the supply channel 4 adjacent to the supply channel 4 arranged in fluidic contact with the chamber inlets 10a. Thus, fluid may enter a micro-reaction chamber 10 via the chamber inlet 10a from a first supply channel and leave the chamber 10 via the chamber outlet 10b to a second supply channel 4, wherein the second supply channel is a different supply channel than the first and also the supply channel next to the first supply channel.

The plurality of supply channels 4 also comprises a first end supply channel 4a arranged for supplying fluid to a first end column 6a of the micro-reaction chambers 10 and a second end supply channel 4b arranged for draining fluid from the second, opposite, end column 6b of the micro-reaction chambers 10. Thus, if there are $N_2$ columns of micro-reaction chambers 10, there are $N_2+1$ number of supply channels 4.

The micro-reactor 1 further comprises at least one reagent inlet 8 in fluid contact with the first end supply channel 4a and a reagent outlet 9 in fluid contact with the second end supply channel such that reagents introduced to the at least one reagent inlet 8 fill the plurality of micro-reaction chambers 10 in a second direction D2 along the rows 7 of micro-reaction chambers 10 to the reagent outlet 9.

In the embodiment illustrated in FIGS. 2a and 2b, direction D1 is perpendicular to direction d2. The direction D1 is the direction of the columns 6 of micro-reaction chambers 10, whereas the direction D2 is the direction of the rows of micro-reaction chambers 10.

As further illustrated in FIG. 2a, the micro reactor 1 further comprises an inlet bus 18a and an outlet bus 18b. The plurality of supply channels 4 are fluidly connected to the inlet bus 18a via a plurality of fluid inlet pressure drop elements 18c in the form of channels such that the plurality of supply channels 4 can be simultaneously addressed by a fluid supplied to the fluid inlet 2. Further, the plurality of supply channels 4 are fluidly connected to the outlet bus 18b such that the plurality of supply channels (4) can be simultaneously drained via the fluid outlet 3.

The micro-reactor 1 further comprises a plurality of reagent inlet pressure drop elements 8a in the form of channels in fluid contact with the first end supply channel 4a and a plurality of reagent outlet channels 9a in fluid contact with the second end supply channel 4b. The micro-reactor 1 further comprises a reagent inlet bus 20a and a reagent outlet bus 20b. The plurality of reagent inlet pressure drop elements 8a are fluidly connected to the reagent inlet bus 20a such that the plurality of reagent inlet pressure drop elements 8a can be simultaneously addressed by a reagent supplied to the reagent inlet 8. Further, the plurality of reagent outlet channels 9a are fluidly connected to the reagent outlet bus 20b such that the plurality of reagent outlet channels 9a can be simultaneously drained via the reagent outlet 9.

The provision of a fluid phase bus pair 18a, 18b and a reagent phase bus pair 20a, 20b along with the fluid inlet pressure drop elements 18c and inlet pressure drop elements 8a, respectively, further provides the advantage of making it possible to equalize the pressure exerted on each of the micro-reaction chambers 10 during introduction of fluids and/or reagents into the micro-reactor 1. By providing inlet bus pair 18a 18b, as well as reagent bus pair 20a, 20b allows for simultaneously addressing all the supply channels 4. The pressure will therefore be more homogenous throughout the micro-reactor 1. This means that fluids and/or reagents can more easily be homogenously distributed throughout the micro-reaction chambers 10 and the supply channels 4 of the micro-reactor 1.

Depending on the phase of the fluid introduced in the micro-reactor, the micro-reaction chambers 110 can be selectively either be in connection with each other, which means that various reagents can be introduced and distributed to each of the micro-reaction chambers 10, or isolated from each other, which minimizes the risk of contamination from one micro-reaction chamber 10 to the other. The micro-reaction chambers 10 can be isolated from each other by introduction of an oil phase, e.g. via the fluid inlet 2. This is illustrated in FIG. 2b. In this example, a first aqueous fluid has been introduced into the fluid inlet 2, thereby filling all chambers 10 via the supply channels 4. Further, reagents may have been introduced into the chambers via the reagent inlet 8. Then, as illustrated in FIG. 2b, an oil phase may be introduced via inlet 2 and, due to the design of the micro-reactor 1, capillary forces prevent the oil from entering the microreactors 10. Thus, the oil will only preferentially fill the supply channels 4, thereby allowing the aqueous fluid and optionally reagents that have been filled into the chambers 10 to be isolated. In this way, a multiple of individually sealed reactions may take place in the plurality of micro-chambers 10, with little or no risk of contamination between chambers 10 during reaction.

The oil phase fluid may be chosen so that it is not be capable of wetting the inner surfaces of the micro-reactor 1. The dimensions of the micro-reaction chambers 10 and supply channels 4 may thus be chosen such that capillary forces prevents the oil phase from entering the micro-reaction chamber 10 from the supply channels 4.

The micro-reaction chambers 10 can thereafter once again be put in fluid connection with each other by introduction of a fluid phase which removes the oil phase from the supply channels 4. Such a fluid phase may be an aqueous phase. The oil phase then exits the micro-reactor 1 through the fluid 1 outlet 3. The first fluid phase, such as an aqueous phase, should be capable of wetting the inner surfaces of the micro-reaction chambers 10 and the supply channels 4.

Figure 3:
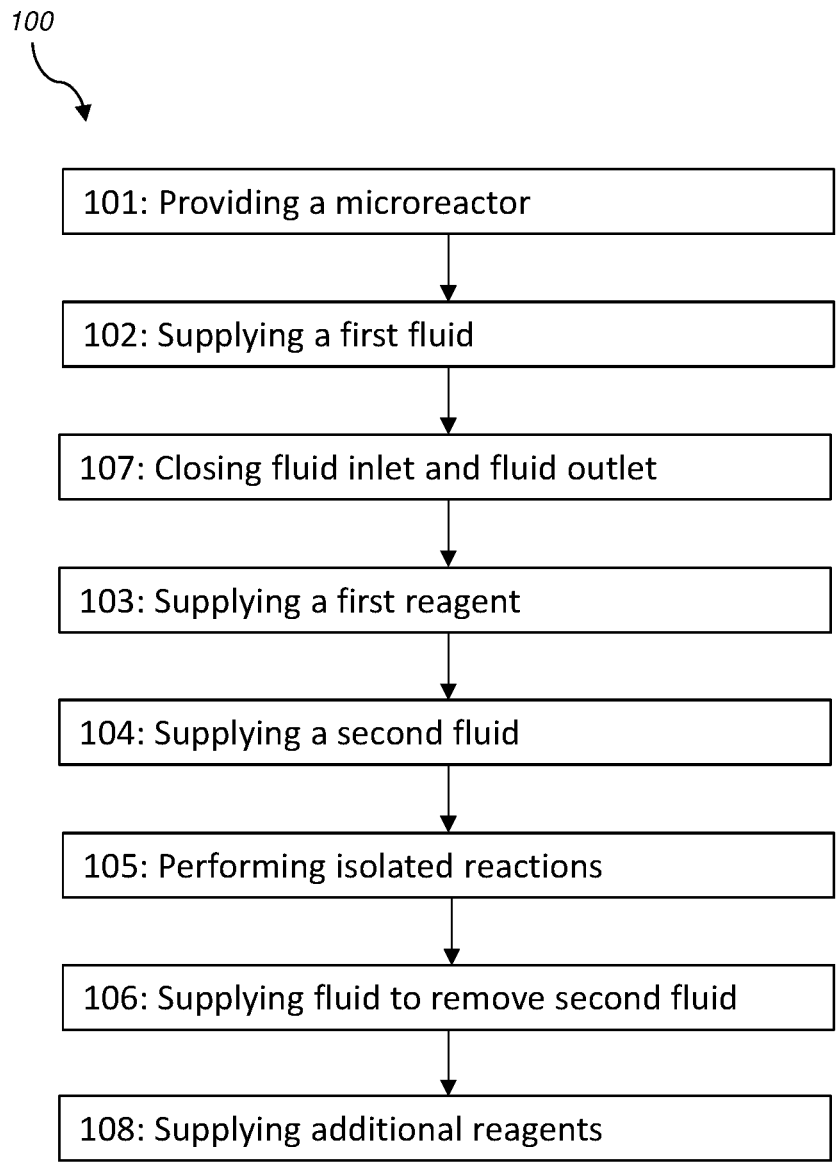
FIG. 3 shows a schematic flowchart describing an example method according to the second aspect of the invention.

FIG. 3 shows a schematic illustration of an example method according to the invention.

The method 100 comprises a step a) of providing 101 a micro-reactor 1 as discussed herein above, e.g. a micro reactor as schematically illustrated in FIG. 2a. The method further comprises a step b) of supplying 102 a first fluid, such as an aqueous fluid, via the fluid inlet 2 or reagent inlet 8 to the supply channels 4 to load the micro-reaction chambers 4 with the first fluid. The first fluid may be a buffer solution. As an example, it may be a buffer solution for cleaning the micro-reaction chambers 10. As a complement or alternative, the first fluid may comprise analytes that are to be reacted with reagents introduced via the reagent inlet 8.

The method then comprises a step c) of supplying 103 a first reagent via the reagent inlet 8 to load the micro-reaction chambers 4 with the reagent. The reagent may thus be introduced to the chambers 10 via the reagent inlet channels 8a. Optimally, the method 100 may comprise a step of closing 107 the fluid inlet and fluid outlet during supply of the reagent via the reagent inlet.

The method may comprise supplying any number of reagents, such as a second reagent, third reagent etc via the reagent inlet 8. This of course depend on the intended chemical reaction that is to take place in the individual micro-reaction chambers 10.

The method further comprises a step d) of supplying 104 a second fluid, such as an oil or oil phase, via the fluid inlet 2 to the supply channels 4, thereby isolating the plurality of micro-reaction chambers 4 from fluid communication with each other. The second fluid is thus immiscible with the first fluid and the second fluid may be supplied using a pressure driven flow.

The method further comprises a step e) of performing 105 isolated reactions in the isolated plurality of micro-reaction chambers 4. The isolated reaction may for example be between different reagents introduced via the reagent inlet in step c), between reagents introduced via the reagent inlet and reagents already present in the microchambers, such as attached to an inner surface of a micro-reaction chambers 10.

The method also comprises a step f) of supplying 106 a fluid via the fluid inlet 2 to remove the second fluid.

This may be followed by additional steps in which further reagents are supplied to the fluid inlet. Thus, steps b)-f) may be repeated any number of times. Consequently, the method 100 may comprise supplying 108 additional reagents via the reagent inlet 8 to load the micro-reaction chambers 4 with the additional reagents. This may be performed in step c) or after step f).

The invention claimed is:

1. A micro-reactor adapted to host chemical reactions having at least one microfluidic layer, said micro-reactor comprising:
    a fluid inlet and a fluid outlet;
    a plurality of micro-reaction chambers arranged in rows and columns, each micro-reaction chamber comprising a chamber inlet and a chamber outlet;
    a plurality of supply channels having ends coupled to the fluid inlet and the fluid outlet for supplying fluid from said fluid inlet to said micro-reaction chambers and further arranged for draining said micro-reaction chambers to said fluid outlet, said supply channels extending in a first direction along the columns of micro-reaction chambers and arranged such that there is one supply channel between adjacent columns;
    and further wherein the micro-reaction chambers in the columns are arranged such that the chamber inlets of a column are in fluid contact with the same supply channel and the chamber outlets are in fluid contact with the supply channel adjacent to the supply channel arranged in fluidic contact with the chamber inlets,
    and wherein the plurality of supply channels comprises a first end supply channel arranged for supplying fluid to a first end column of the micro-reaction chambers and a second end supply channel arranged for draining fluid from the second, opposite, end column of said micro-reaction chambers;
    and wherein the micro-reactor further comprises
    at least one reagent inlet in fluid contact with the first end supply channel through a side of the first end supply channel and a reagent outlet in fluid contact with the second end supply channel through a side of the second end supply channel such that reagents introduced to the at least one reagent inlet fill the plurality of micro-reaction chambers in a second direction along the rows of micro-reaction chambers to the reagent outlet.

2. A micro-reactor according to claim 1, wherein the micro-reaction chambers and supply channels are configured such that when introducing a first fluid to the micro-reaction chambers and thereafter a second fluid, said second fluid being immiscible with said first fluid, capillary forces prevent said second fluid from entering the micro-reaction chambers.

3. A micro-reactor according to claim 1, wherein the micro-reactor further comprises
    an inlet bus and an outlet bus, and wherein
    said plurality of supply channels are fluidly connected to said inlet bus via a plurality of fluid inlet pressure drop elements such that the plurality of supply channels can be simultaneously addressed by a fluid supplied to said fluid inlet, and wherein said plurality of supply channels are fluidly connected to said outlet bus such that the plurality of supply channels can be simultaneously drained via said fluid outlet.

4. A micro-reactor according to claim 1, wherein the micro-reactor further comprises
    a plurality of reagent inlet pressure drop elements in fluid contact with the first end supply channel and a plurality of reagent outlet channels in fluid contact with the second end supply channel; and wherein the micro-reactor further comprises
    a reagent inlet bus and a reagent outlet bus, and wherein said plurality of reagent inlet pressure drop elements are fluidly connected to said reagent inlet bus such that the plurality of reagent inlet pressure drop elements can be simultaneously addressed by a reagent supplied to said at least one reagent inlet, and wherein said plurality of reagent outlet channels are fluidly connected to said reagent outlet bus such that the plurality of reagent outlet channels can be simultaneously drained via said reagent outlet.

5. A micro-reactor according to claim 1, wherein the chamber inlets are configured such that fluid transport from a supply channel to each micro-reaction chamber via the chamber inlet occurs mainly by capillary forces.

6. A micro-reactor according to claim 5, wherein the supply channels have a first cross-sectional area As and the chamber inlet of each micro-reaction chamber has a second cross-sectional area $A_c$, wherein the first to second cross-sectional area ratio is configured such that fluid transport from the supply channels to at least one micro-reaction chamber of the plurality of micro-reaction chamber occurs mainly by capillary forces.

7. A micro-reactor according to claim 6, wherein the supply channels further have a first perimeter of the channel cross-section $P_s$, and the micro-reaction chambers further have a second perimeter of the channel cross-section $P_c$, wherein the first to second cross-sectional area ratio ($A_s:A_c$) is larger than the first to second perimeter ratio ($P_s:P_c$).

8. A micro-reactor according to claim 1, wherein at least one micro-reaction chamber comprises an elongated fluid path.

9. A micro-reactor according claim 8, wherein the the elongated fluid path comprises at least two turns of more than 90 degrees.

10. A micro-reactor according to claim 1, wherein the supply channels and the plurality of micro-reaction chambers are arranged in a common one of the at least one microfluidic layer.

11. A micro-reactor according to claim 1, wherein the inner surfaces of the micro-reactor comprises a material that is wettable by a fluid adapted to be used in the micro-reactor, wherein the fluid is a sample fluid and/or a reagent fluid.

12. A micro-reactor according to claim 1, wherein at least one of the micro-reaction chambers is loaded with a sample to be studied.

13. A micro-reactor according to claim 1, wherein the inner surface of at least one micro-reaction chamber is functionalized.

14. A micro-reactor according to claim 1, wherein the inner surface of at least one micro-reaction chamber is oleophobic.

15. A method of performing a chemical reaction at a micro-reactor comprising the steps of:
    a) providing a micro-reactor according to claim 1;
    b) supplying a first fluid via the fluid inlet or the at least one reagent inlet to said supply channels to load the micro-reaction chambers with said first fluid;
    c) supplying a first reagent via the at least one reagent inlet to load the micro-reaction chambers with said reagent;
    d) supplying a second fluid via the fluid inlet to said supply channels, wherein said second fluid is immiscible with the first fluid, thereby isolating the plurality of micro-reaction chambers from fluid communication with each other,
    e) performing isolated reactions in the isolated plurality of micro-reaction chambers; and
    f) supplying a fluid via the fluid inlet to remove said second fluid.

16. The method according to claim 15, further comprising closing the fluid inlet and the fluid outlet during step c).

17. The method according to claim 15, further comprising supplying additional reagents via the at least one reagent inlet to load the micro-reaction chambers—with said additional reagents in step c) or after step f).

18. The method according to claim 15, wherein the second fluid is supplied using a pressure driven flow.

19. The method according to claim 15, wherein the first fluid is an aqueous solution and wherein the second fluid is an oil.

20. Microfluidic device or system for isolation of individual micro-reaction chambers comprising at least one micro-reactor according to claim 1.

* * * * *